United States Patent
Taylor et al.

(10) Patent No.: US 10,872,164 B2
(45) Date of Patent: Dec. 22, 2020

(54) TRUSTED ACCESS CONTROL VALUE SYSTEMS

(71) Applicant: BANK OF AMERICA CORPORATION, Charlotte, NC (US)

(72) Inventors: Jo-Ann Taylor, Godalming (GB); Manu J. Kurian, Dallas, TX (US)

(73) Assignee: Bank of America Corporation, Charlotte, NC (US)

( * ) Notice: Subject to any disclaimer, the term of this patent is extended or adjusted under 35 U.S.C. 154(b) by 87 days.

(21) Appl. No.: 16/192,662

(22) Filed: Nov. 15, 2018

(65) Prior Publication Data

US 2020/0159945 A1  May 21, 2020

(51) Int. Cl.
*G06F 21/62* (2013.01)
*H04L 9/08* (2006.01)
*H04L 9/30* (2006.01)

(52) U.S. Cl.
CPC .......... *G06F 21/6218* (2013.01); *H04L 9/088* (2013.01); *H04L 9/30* (2013.01)

(58) Field of Classification Search
None
See application file for complete search history.

(56) References Cited

U.S. PATENT DOCUMENTS

| | | | |
|---|---|---|---|
| 7,467,202 B2 | 12/2008 | Savchuk | |
| 9,197,628 B1 | 11/2015 | Hastings | |
| 9,225,734 B1 | 12/2015 | Hastings | |
| 9,430,646 B1 | 8/2016 | Mushtaq et al. | |
| 9,716,598 B2 | 7/2017 | Kubota et al. | |
| 9,756,017 B2 | 9/2017 | Hastings | |
| 9,779,254 B2 | 10/2017 | Galil et al. | |
| 9,934,381 B1 | 4/2018 | Kindlund et al. | |
| 2015/0058997 A1* | 2/2015 | Lee | G06F 21/6281 726/26 |
| 2016/0011245 A1 | 1/2016 | Gerber et al. | |
| 2016/0239497 A1* | 8/2016 | O'Donnell | G06F 16/24578 |
| 2018/0018467 A1 | 1/2018 | Tsai et al. | |
| 2018/0124014 A1 | 5/2018 | Liang | |

OTHER PUBLICATIONS

Kurian, M. et al., "Access Control Value Systems," U.S. Appl. No. 16/192,625, filed Nov. 15, 2018, 43 pages.

* cited by examiner

*Primary Examiner* — Brandon S Hoffman
(74) *Attorney, Agent, or Firm* — Michael A. Springs

(57) ABSTRACT

A system that includes a tagging engine and a routing engine. The tagging engine is configured to link a data element with an access control tag array that links access control tags with end user groups. The tagging engine is configured to encrypt a hash of the access control tag array using a first key and to apply a second key to the access control tag array to obfuscate the access control tag array. The tagging engine is configured to send the data element, the encrypted hash, and the obfuscated access control tag array to a target network node. The routing engine is configured to compute a hash of the access control tag array and to forward the data element to the target network node in response to determining that the received hash of the access control tag array to the computed access control tag array are the same.

14 Claims, 6 Drawing Sheets

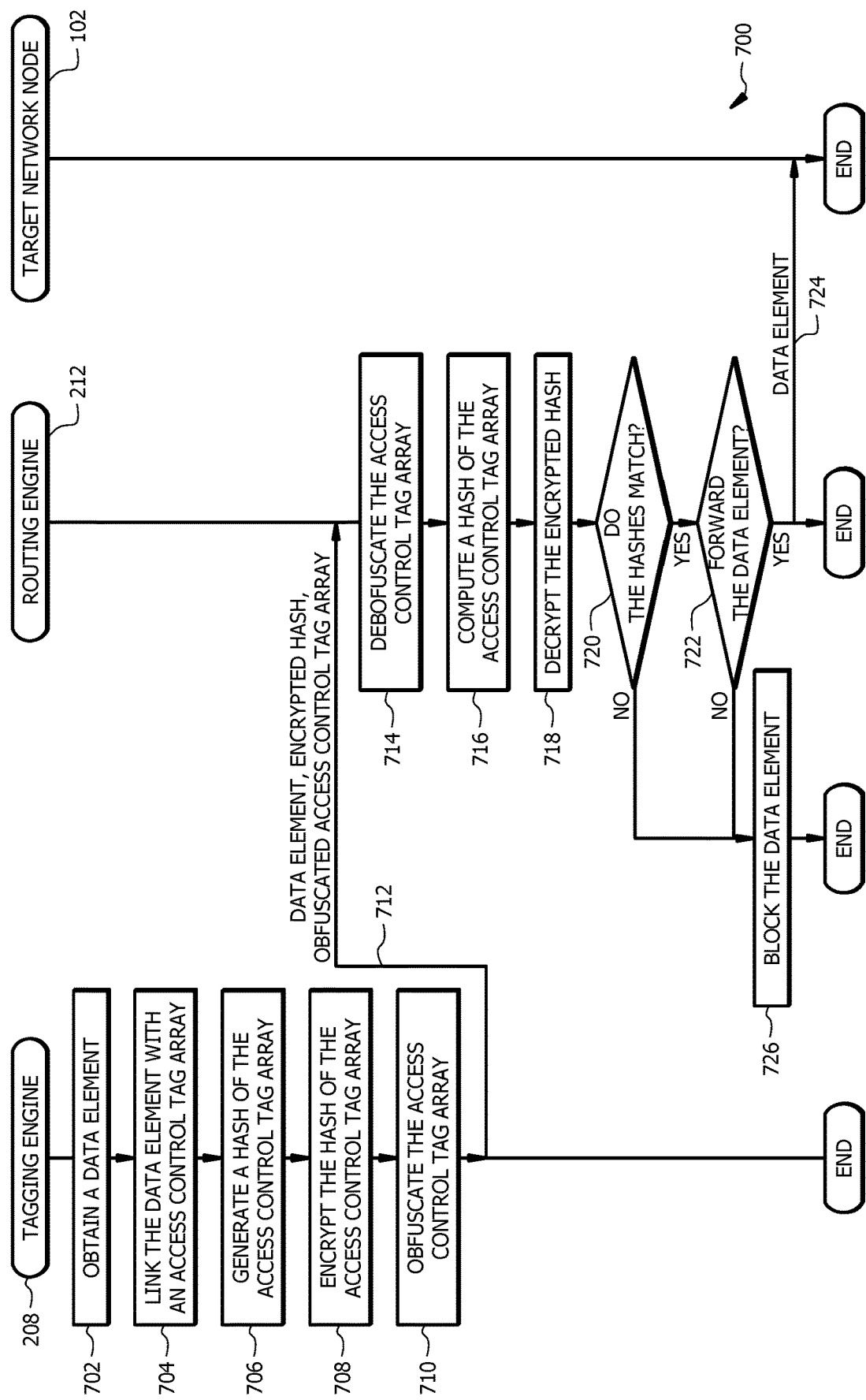

TRUSTED ACCESS CONTROL VALUE SYSTEMS

TECHNICAL FIELD

The present disclosure relates generally to access control, and more specifically to providing access control for data in a computer network.

BACKGROUND

One of the technical challenges associated with sharing data within a computer network is providing secure data access control. Existing systems typically provide an all or nothing approach for providing data access control based on file names or file types. This approach is overly restrictive and cannot be adapted to support data that need to be accessible to some network devices while being restricted from others. For example, personal information for a user may need to be accessible to network devices in some business groups but should also be restricted from other business groups. Existing approaches are unable to selectively specify data access control permission for various network devices. This poses a technical challenge for computer systems because they are limited in their ability to distribute and share information while providing a data access control.

SUMMARY

One of the technical challenges associated with sharing data within a computer network is providing secure data access control. Existing systems typically provide an all or nothing approach for providing data access control based on file names or file types. This approach is overly restrictive and cannot be adapted to support data that need to be accessible to some network devices while being restricted from others. For example, personal information for a user may need to be accessible to network devices in some business groups but should also be restricted from other business groups. Existing approaches are unable to selectively specify data access control permission for various network devices. This poses a technical challenge for computer systems because they are limited in their ability to distribute and share information while providing a data access control.

Another technical challenge associated with sharing data within a network is preventing unauthorized parties from accessing or modifying data that is transmitted through the network. For example, a bad actor may employ malware to perform a man-in-the-middle attack to intercept data that is being transmitted through the network. Using malware, a bad actor can exfiltrate and/or modify data that is being transmitted through the network. Once malware is downloaded into the computer system, the malware can overload computing resources by running authorized programs and scripts on the system. In addition, malware can cause disruptions to computer operations, data exfiltration, unauthorized access to system resources, slower processing speeds, connectivity issues, and frequent freezing or crashing. While computing resources are occupied by malware, the computer system has less processing resources and memory to perform other operations. This results in reduced performance of the system. Malware may also reduce the network bandwidth of the computer system by making unauthorized downloads or exfiltrating data from the computer system. Reducing the network bandwidth of the computer system limits the system's ability to send and receive data which degrades the throughput of the system. Thus, it is desirable to protect computer systems and their resources from attacks when communicating with other computer systems.

The system described in the present application provides a technical solution to the technical problems discussed above by enabling the computer system to provide secure data access control to data that is shared within a network. The system disclosed herein provides several technical advantages which include 1) the ability to add context information to data using access control tag array for data access control and 2) providing enhanced security against man-in-the-middle attacks for data communicated through a network.

In one embodiment, the disclosed computer system employs a tagging engine to link data elements with access control tag arrays. The access control tag array provides context information that indicates access control permission levels associated with a set of end user groups. The tagging engine provides data access control and security to data elements that are transmitted through the network. The access control tag array provides information that allows network devices to determine whether a target network device for a data element has permission to access and receive the data element. Using access control tag arrays, network devices are able to selectively route the data element. This process is robust against man-in-the-middle style attacks and improves the operation of the system by preventing these types of attacks that can gain unauthorize access to system resources, reduce the performance of the system, or exfiltrate data.

In one embodiment, the computer system may also be configured to employ a verification engine that is configured to inspect an access control tag array that is linked with a data element to detect whether the access control tag array has been compromised or modified during transmission. In this configuration, the verification engine also provides protection against attacks and provides the ability to verify access control tags before allowing data elements to be distributed through the network.

In one embodiment, the computer system may be configured to employ a routing engine to selectively route a data element based on the information provided by an access control tag array linked with the data element. For example, a routing engine may determine whether a target network device for the data element is authorized to receive the data element based on the information provided by the access control tag array. In this example, the access control tag array may specify different access control levels for different target network devices. The routing engine may either forward the data element or block transmission of the data element based on the determination. In one embodiment, the routing engine may be configured to send the data element in response to determining that the access control tag array linked with data element was sent by a trusted source and that the access control tag array was not modified during transmission. This process expands the capabilities of existing data access control approaches which typically use an all or nothing approach.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description.

FIG. 7 is a protocol diagram of an embodiment of a secured tagging method for the access control system.

DETAILED DESCRIPTION

The system disclosed herein provides several technical advantages which include 1) the ability to add context information to data using access control tag array for data access control and 2) providing enhanced security against man-in-the-middle attacks for data communicated through a network.

Figure 1:
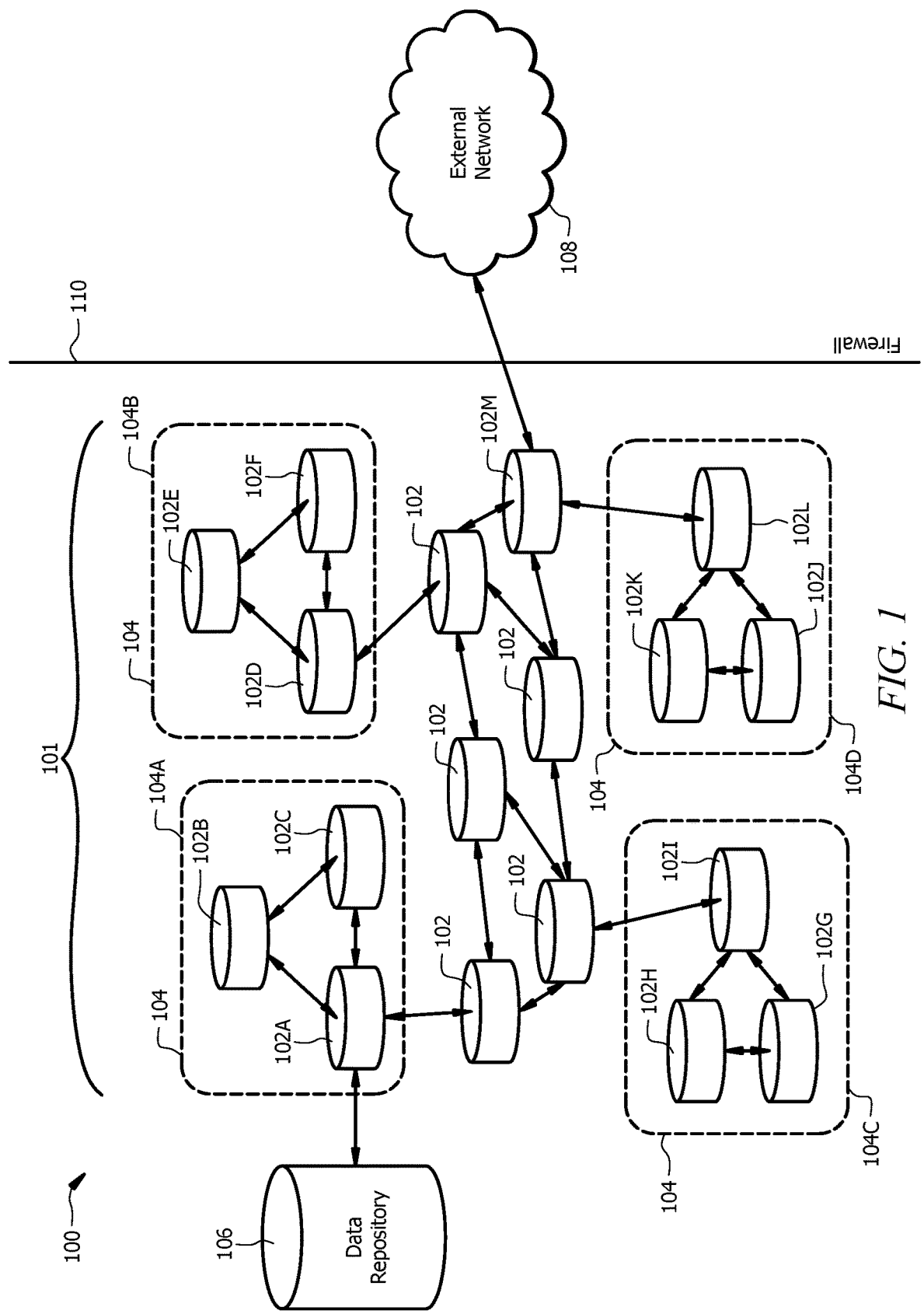
FIG. 1 is a schematic diagram of an embodiment of an access control system.
Figure 2:
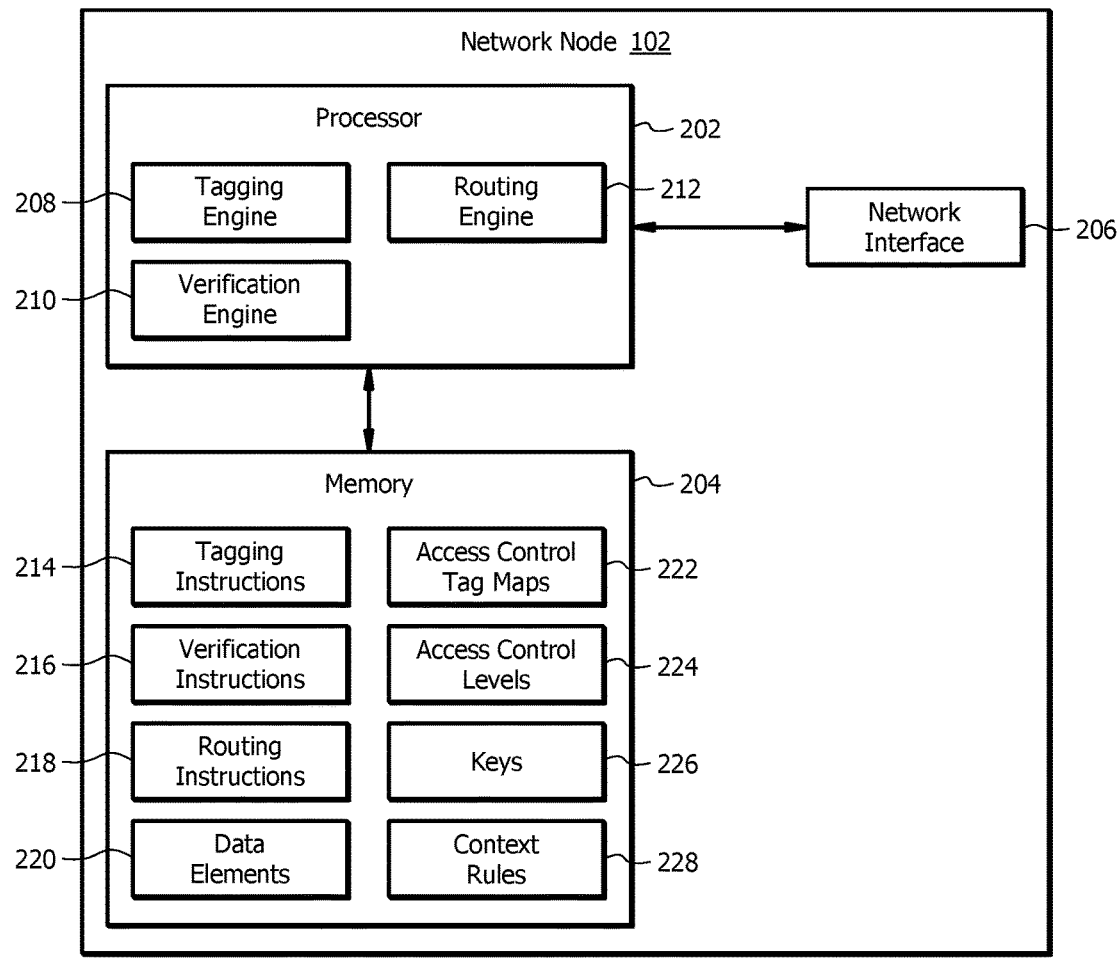
FIG. 2 is a schematic diagram of an embodiment of a network node in the access control system.
Figure 3:
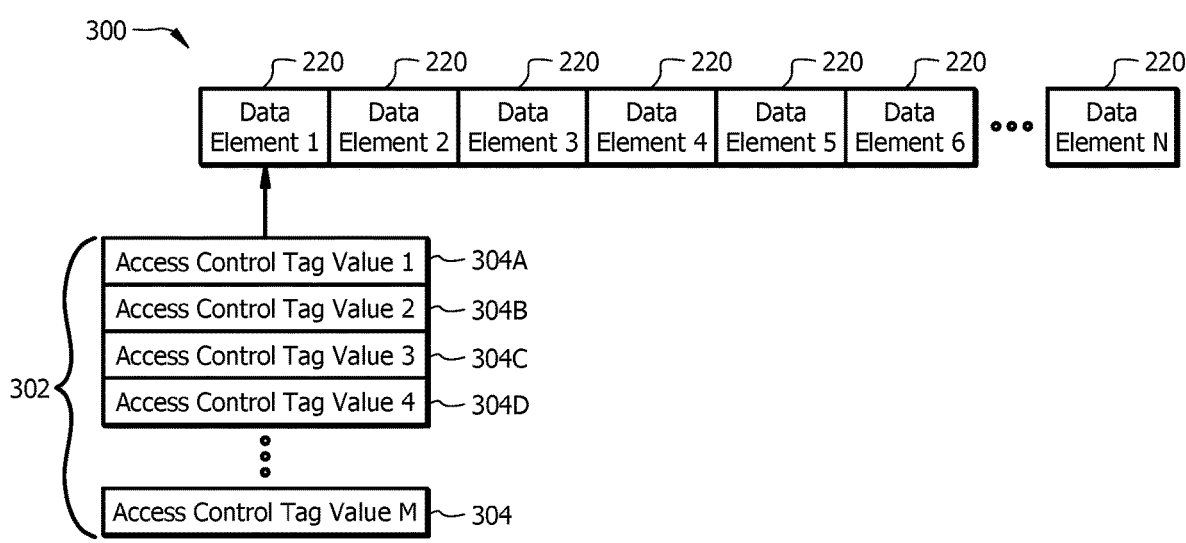
FIG. 3 is a schematic diagram of an embodiment of a data stream using access control tags arrays.
Figure 4:
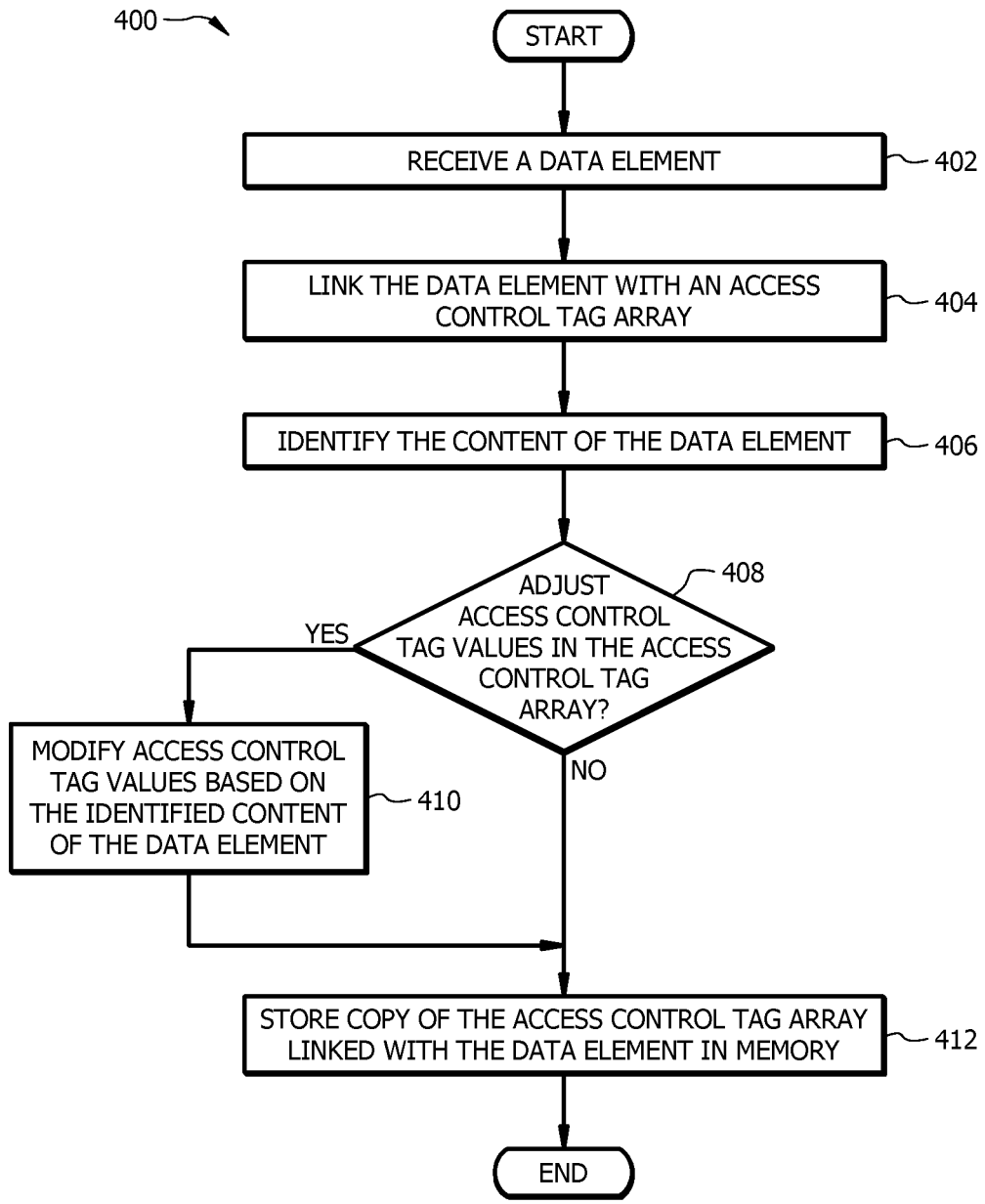
FIG. 4 is a flowchart of an embodiment of a tagging method for a tagging engine in the access control system.
Figure 5:
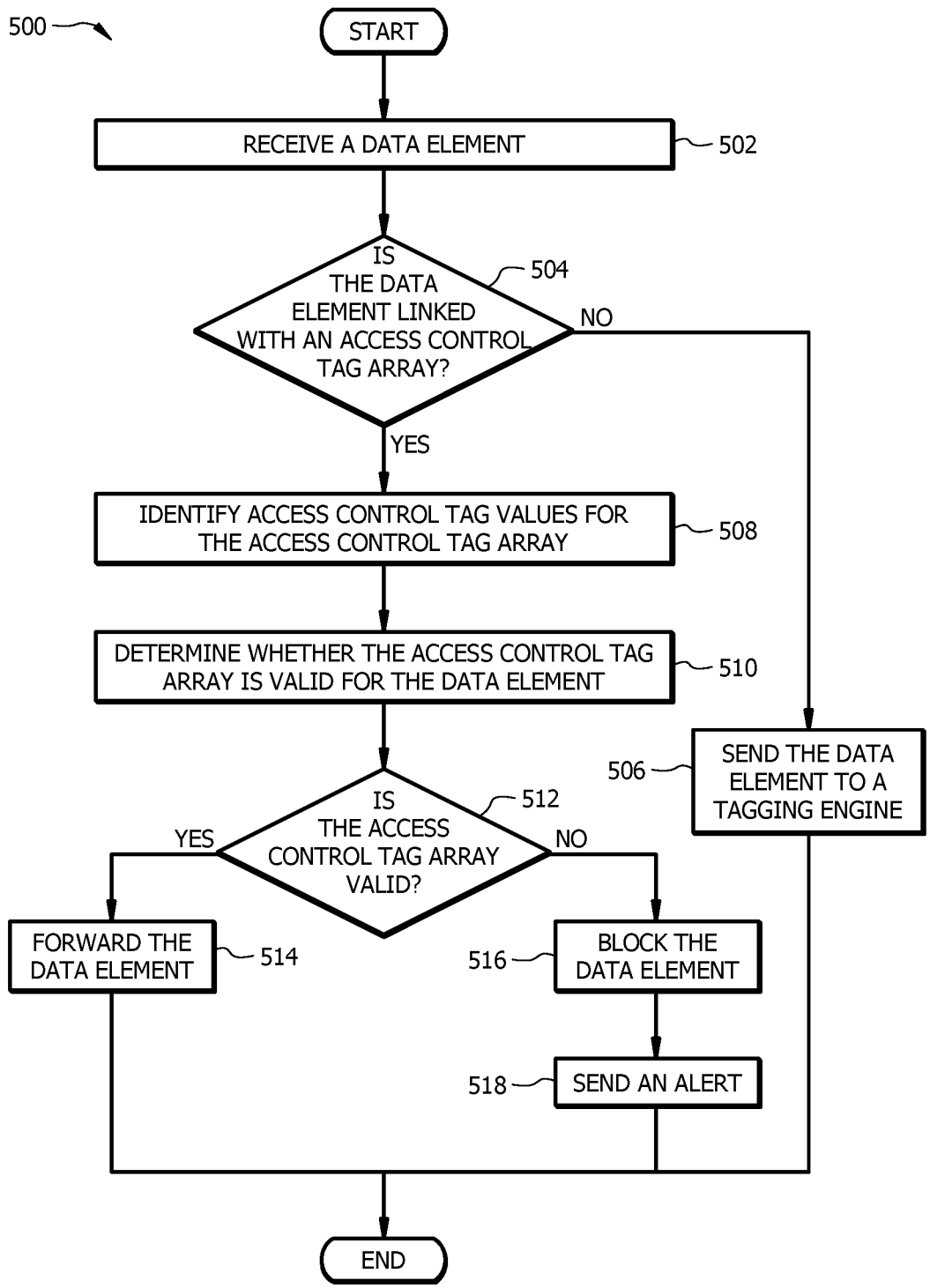
FIG. 5 is a flowchart of an embodiment of a verification method for a verification engine in the access control system.
Figure 6:
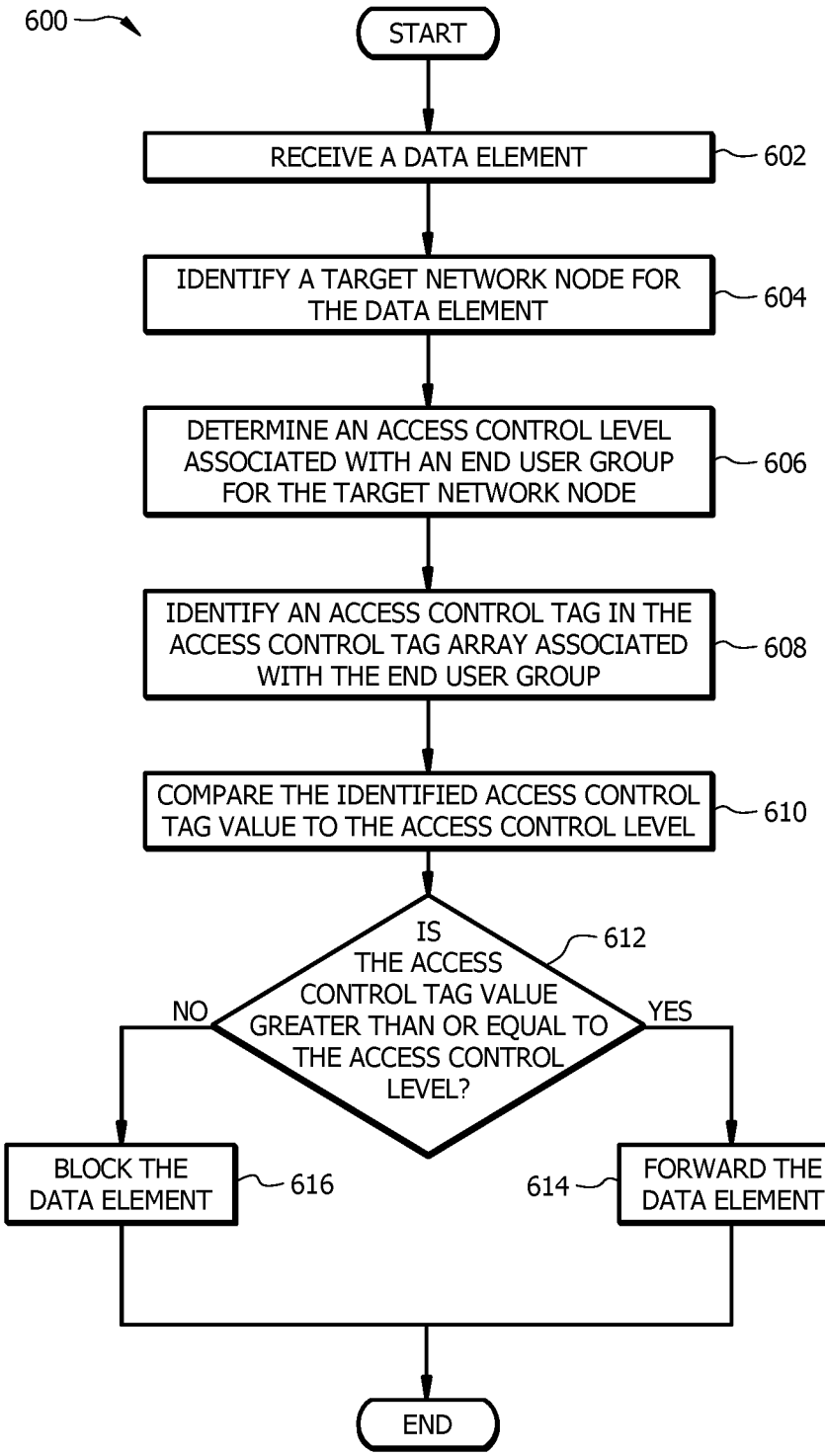
FIG. 6 is a flowchart of an embodiment of a routing method for a routing engine in the access control system.

FIG. 1 is an example of a system configuration that uses access control tag array to provide data access control. FIG. 2 is an example of a network node configured to implement the various data access control techniques disclosed herein. FIG. 3 is an example of a data stream comprising data elements that are linked with access control tag arrays. FIG. 4 is an example of a process for tagging data elements with an access control tag array. FIG. 5 is an example of a process for analyzing an access control tag array to determine whether the access control tag array has been modified during transmission. FIG. 6 is an example of a process for selectively routing data elements based on information provided by an access control tag array linked with the data element. FIG. 7 is an example of a process for providing additional security to data elements that are linked with an access control tag array.

FIG. 1 is a schematic diagram of an embodiment of an access control system 100. The access control system 100 comprises a plurality of network nodes 102 configured to form a network 101. The network 101 is any suitable type of wireless and/or wired network including, but not limited to, all or a portion of the Internet, an Intranet, a private network, a public network, a peer-to-peer network, the public switched telephone network, a cellular network, and a satellite network. Examples of network nodes 102 include, but are not limited to, computers, Internet-of-things (IoT) devices, mobile devices (e.g. smart phones or tablets), web clients, web servers, routers, modems, bridges, or any other suitable type of network device. The access control system 100 may be configured as shown in FIG. 1 or in any other suitable configuration. For example, the access control system 100 may comprise any suitable number of network nodes 102 and/or configuration of network nodes 102.

One or more network nodes 102 may associated with each other to form an end user group 104. In one embodiment, end user groups 104 are departments or groups within an entity (e.g. a business or organization). For example, a first end user group 104A may comprise network nodes 102A, 102B, and 102C and may be associated with an accounting group. A second end user group 104B may comprise network nodes 102D, 102E, and 102F and may be associated with a marketing group. A third end user group 104C may comprise network nodes 102G, 102H, and 102I and may be associated with an engineering group. A fourth end user group 104D may comprise network nodes 102J, 102K, and 102L and may be associated with an information security group. In other examples, an end user group 104 may comprise any number of network nodes 102 and may be associated with any other type of group. In one embodiment, an end user group 104 may be associated with a network node that is outside of the network 101. For example, an end user group 104 may be associated with one or more network nodes in an external network 108.

In one embodiment, an end user group 104 may be configured as a safe zone within the network 101 where blocked data elements can be rerouted for further analysis and/or approval for transmission. For example, a safe zone may comprise one or more network nodes 102 that are isolated from other network nodes 102 in the network 101 with administrative privileges for accessing data elements.

Additional information about network nodes 102 is described in FIG. 2. Network nodes 102 may be configured to implement a tagging engine, a verification engine, and/or a routing engine. Information about the tagging engine, the verification engine, and the routing engine is described below and in FIGS. 4-7.

Tagging Engine

A tagging engine is configured to add context information to a data element by linking the data element with an access control tag array. The access control tag array provides context information that indicates access control permission levels associated with a set of end user groups 104. Additional information about access control tag arrays is described in FIG. 3. The tagging engine provides data access control and security to data elements that are transmitted through the network. The access control tag array provides information that allows network nodes to determine whether a target network node for a data element has permission to access and receive the data element. Using access control tag arrays, devices (e.g. a routing engine) are able to selectively route the data element. This process also provides security against man-in-the-middle style attacks where data is modified during transmission. In one embodiment, a receiving network node 102 can process the received data element and its access control tag array to verify that the data element was sent by a trusted sender and that the access control tag array was not modified during transmission. Examples of the tagging engine in operation are described in FIGS. 4 and 7.

Verification Engine

A verification engine is configured to inspect an access control tag array that is linked with a data element to detect whether the access control tag array has been compromised or modified during transmission. The access control tag array provides information that is used for providing data access control. This means that if a bad actor is able to modify values in an access control tag array, then they will be able to gain unauthorized access to data elements and compromise the security of the network 101. The verification engine provides protection against these types of man-in-the-middle attacks by intercepting data elements and verifying their access control tags before allowing the data element to continue transmission through the network 101. In some embodiments, the verification engine is configured to reroute data elements to a tagging engine in response to determining that the data element is not linked with an access control tag array. An example of the verification engine in operation is described in FIG. 5.

Routing Engine

A routing engine is configured to selectively route a data element based on the information provided by an access control tag array linked with the data element. For example, a routing engine may determine whether a target network node 102 is authorized to receive the data element based on the information provided by the access control tag array and may either forward the data element or block transmission of the data element based on the determination. Examples of the routing engine in operation are described in FIGS. 6 and 7.

One or more network nodes 102 may be in signal communication with a data repository 106. Examples of data repositories 106 include, but are not limited to, the Internet, social media, databases, memories, servers, computing devices, or any other suitable type of data source. For example, a data repository 106 may be an authorized data source managed by the access control system 100. Data repositories 106 are configured to store documents, video files, audio files, text files, images, and/or any other type of data. In one embodiment, a data repository 106 is configured to periodically send data to one or more network nodes 102. For example, a data repository 106 may be configured to send data to a network node 102 in real-time or at predetermined time intervals (e.g. hourly or daily). As another example, a data repository 102 may be configured to send data in response to a data request from a network node 102. The data repository 106 may be a member of the network 101 or may be external to the network 101.

One or more network nodes 102 may be in signal communication with an external network 108. For example, a network node 102M may be connected to the external network 108 via a firewall 110. The firewall 110 may be any suitable type of firewall as would be appreciated by one of ordinary skill in the art. In this example, the network node 102M in communication with the external network 108 may also be referred to as an edge network node 102. The external network 108 is any suitable type of wireless and/or wired network including, but not limited to, all or a portion of the Internet, an Intranet, a private network, a public network, a peer-to-peer network, the public switched telephone network, a cellular network, and a satellite network. The external network 108 is configured to support any suitable communication protocols as would be appreciated by one of ordinary skill in the art upon viewing this disclosure. The external network 108 may comprise one or more network devices. Examples of network devices include, but are not limited to, computers, mobile devices, web clients, web servers, routers, modems, bridges, or any other suitable type of network device.

FIG. 2 is a schematic diagram of an embodiment of a network node 102 in the access control system 100. The network node 102 comprises a processor 202, a memory 204, and a network interface 206. The network interface 102 may be configured as shown or in any other suitable configuration.

The processor 202 comprises one or more processors operably coupled to the memory 204. The processor 202 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 202 may be a programmable logic device, a microcontroller, a microprocessor, or any suitable combination of the preceding. The processor 202 is communicatively coupled to and in signal communication with the memory 204. The one or more processors are configured to process data and may be implemented in hardware or software. For example, the processor 202 may be 8-bit, 16-bit, 32-bit, 64-bit or of any other suitable architecture. The processor 202 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions to implement a tagging engine 208, a verification engine 210, and a routing engine 212. In this way, processor 202 may be a special purpose computer designed to implement function disclosed herein. In an embodiment, the tagging engine 208, the verification engine 210, and the routing engine 212 are each implemented using logic units, FPGAs, ASICs, DSPs, or any other suitable hardware.

The tagging engine 208, the verification engine 210, and the routing engine 212 are configured similar to the tagging engine, the verification engine, and the routing engine described in FIG. 1, respectively.

The memory 204 comprises one or more disks, tape drives, or solid-state drives, and may be used as an over-flow data storage device, to store programs when such programs are selected for execution, and to store instructions and data that are read during program execution. The memory 204 may be volatile or non-volatile and may comprise read-only memory (ROM), random-access memory (RAM), ternary content-addressable memory (TCAM), dynamic random-access memory (DRAM), and static random-access memory (SRAM). The memory 204 is operable to store tagging instructions 214, verification instructions 216, routing instructions 218, data elements 220, access control tag maps 222, access control levels 224, keys 226, context rules 228, and/or any other data or instructions. The tagging instructions 214, the verification instructions 216, and the routing instructions 218 may comprise any suitable set of instructions, logic, rules, or code operable to execute the tagging engine 208, the verification engine 210, and the routing engine 212, respectively.

A data element 220 may be any suitable type of information or data that is transmitted through the access control system 100. Examples of data elements 220 include, but are not limited to, documents, video files, audio files, text files, images, and/or any other type of data.

Access control tag maps 222 provide information about the access control tag values of access control tag arrays that are linked with data elements 220. For example, access control tag maps 222 may be stored copies of access control tag arrays 302 that are linked with data elements 220. Access control tag maps 222 may be used as a reference to determine whether an access control tag array 302 has been modified after it was generated. An example of using an access control tag map 222 to determine whether an access control tag array 302 has been modified is described in FIG. 5.

Access control levels 224 may be linked with network nodes 102 and/or end user groups 104 to indicate a level of access permission. For example, access control levels 224 can be set and used to restrict access to data elements 220 with certain types of content. For example, an access control tag can be set with a value such that some end user groups 104 can access a data element 220 while other end user groups 104 are unable to access the data element 220 based on their access control level 224.

Keys 226 are employed to protect data (e.g. access control tag arrays) and to provide a mechanism for verifying that data is being sent from a trusted source. Examples of keys 226 include, but are not limited to, encryption keys, hashing keys, private keys, public keys, or any other suitable type of key. An example of using keys 226 is described in FIG. 7.

Context rules 228 link content with access control tag values for access control tag arrays. Context rules 228 provide a mapping between different types of data content and access control tag values for a set of end user groups 104. For example, context rules 228 may indicate a first set of access control tag values that are to be used for content such as personal information and a second set of access control tag values that are to be used for content such as demographic information. Examples of content include, but are not limited to, personal information, financial information, demographic information, user history, account information, general information, publicly available information, confidential information, or any other suitable type of content.

The network interface 206 is configured to enable wired and/or wireless communications. The network interface 206 is configured to communicate data between network nodes 102 in the access control system 100 and/or any other system or domain. For example, the network interface 206 may comprise a WIFI interface, a local area network (LAN) interface, a wide area network (WAN) interface, a modem, a switch, or a router. The processor 202 is configured to send and receive data using the network interface 206. The network interface 206 may be configured to use any suitable type of communication protocol as would be appreciated by one of ordinary skill in the art.

FIG. 3 is a schematic diagram of an embodiment of a data stream 300 using access control tags arrays 302. A data stream 300 may comprise one or more data elements 220. Each data element 220 is linked with an access control tag array 302 comprising a plurality of access control tags 304.

Each access control tag 304 is linked with an end user group 104 and indicates an access control tag value for the end user group 104. For example, the access control tag array 302 may comprise a first access control tag 304A linked with a first end user group 104, a second access control tag 304B linked with a second end user group 104, a third access control tag 304C linked with a third end user group 104, and a fourth access control tag 304D linked with a fourth end user group 104. An access control tag array 302 may comprise any suitable number of access control tags 304. In some embodiments, one or more access control tags 304 are linked with network nodes 102 or end user groups 104 outside of the network 101. For example, access control tags 304 may be linked with a network node or end user group in an external network 108.

Data elements 220 may be associated with different levels of access control for each end user group 104. Some types of data content may be routine information for some end user groups 104 but should not be shared with other end user groups 104. For example, financial information may need to be accessible for end user groups 104 dealing with personal finance but also should not be accessible to other end user groups 104. The access control tag value is a value (e.g. an alphanumeric value) that indicates a level of access control associated with a corresponding end user group 104. Access control tag values can be set based on the content of a data element 220 and how accessible the data element 220 should be to different end user groups 104.

In one embodiment, a higher numeric value for the access control tag 304 corresponds with more restrictive access and a lower numeric value for the access control tag 304 may correspond with less restrictive access. For example, a data element 220 may be linked with an access control tag array 302 that comprises a first access control tag 304A with a value of two and a second access control tag 304B with a value of nine. The access control tag value can be used to control which end user groups 104 have access to the data element 220. In this example, an end user group 104 with an access control level greater than or equal to the access control tag value is permitted to access the data element 220 while end user groups 104 with an access control level less than the access control tag value cannot access or receive the data element 220. The first end user group 104 may have an access control level of one and may not be allowed to access the data element 220. The second end user group 104 may have an access level of five and may be permitted to access the data element 220. In an alternative embodiment, a lower numeric value for the access control tag 304 corresponds with more restrictive access and a higher numeric value for the access control tag 304 may correspond with less restrictive access. In this example, an end user group 104 with an access control level less than or equal to the access control tag value is permitted to access the data element 220 while end user groups 104 with an access control level greater than the access control tag value cannot access or receive the data element 220.

In one embodiment, linking a data element 220 with an access control tag array 302 comprises embedding the access control tag array 302 within the data element 220. For example, the access control tag array 302 may be embedded with a data element 220 as metadata. In another embodiment, linking a data element 220 with an access control tag array 302 comprises appending the access control tag array 302 to the data element 220. For example, the data element 220 may be modified to include the access control tag array 302. In another embodiment, linking a data element 220 with an access control tag array 302 comprises storing the access control tag array 302 as a new data element. In this example, the new data element comprising the access control tag array information may be transmitted with data element 220. In other embodiments, an access control tag array 302 may be linked with a data element 220 using any other suitable technique.

Data Tagging

FIG. 4 is a flowchart of an embodiment of a tagging method 400 for a tagging engine 208 in the access control system 100. The tagging engine 208 may implement method 400 to add context information to a data element 220 by linking the data element 220 with an access control tag array 302. This process enables other devices (e.g. a routing engine 212) to selectively route the data element 220 based on the information provided by the access control tag array 302. For example, a routing engine 212 may determine whether a target network node 102 for the data element 220 is authorized to receive the data element 220 based on the information provided by the access control tag array 302 and may either forward the data element 220 or block transmission of the data element 220 based on the determination.

At step 402, the tagging engine 208 receives a data element 220. In one embodiment, the tagging engine 208 receives the data element 220 from a network node 102 that generates or originates the data element 220. For example, the data element 220 may be generated by the same network node 102 where the tagging engine 208 is being implemented. In another embodiment, the tagging engine 208 receives the data element 220 from a data repository 106. For example, the tagging engine 208 may access the data repository 106 to obtain the data element 220. In some examples, the data element 220 may be modified before the tagging engine 208 receives the data element 220. For instance, the data element 220 may be reformatted or edited before the tagging engine 208 receives the data element 220.

At step 404, the tagging engine 208 links the data element 220 with an access control tag array 302. In one embodiment, the access control tag array 302 is initialized with baseline access control tag values. For example, the each of the access control tags 304 in the access control tag array 302 may be initialized with a value of one. In other examples, the access control tags 304 may be initialized with any other suitable baseline value. In one embodiment, the baseline access control tag value serves as a limit for adjusting access control tag values. For example, the baseline access control tag value may be used as a lower limit which means that the access control tag value cannot be adjusted below the baseline access control tag value. As another example, the baseline access control tag value may be used as an upper limit which means that the access control tag value cannot be adjusted above the baseline access control tag value.

At step 406, the tagging engine 208 identifies the content of the data element 220. In one embodiment, the tagging engine 208 employ machine learning, natural language processing, or any other suitable technique for determining the content of the data element 220 as would be appreciated by one of ordinary skill in the art. For example, the tagging engine 208 may employ natural language processing to identify text or images within the data element 220 and to determine the content of the text. In this example, the tagging engine 220 may determine that the data element 220 included personal information such as an address or a social security number. In other examples, the tagging engine 208 may identify any other content within the data element 220.

At step 408, the tagging engine 208 determines whether to adjust access control tag values in the access control tag array 302. In one embodiment, the tagging engine 208 applies context rules 228 to the access control tag array 302 based on the identified content of the data element 220. The context rules 228 indicate whether any of the access control tag values should be adjusted based on the identified content of the data element 220. For example, if the data content 220 comprises information that should be restricted for some end user groups 104, the context rules 228 will indicate new values for the access control tags 304 associated with these end user groups 104. The tagging engine 208 proceeds to step 410 in response to determining to adjust one or more of the access control tag values based on the content of the data element 220. The tagging engine 208 proceeds to step 412 in response to determining not to adjust any of the access control tag values based on the content of the data element 220.

At step 410, the tagging engine 208 modifies access control tag values based on the identified content of the data element 220. In other words, the tagging engine 208 adjusts access control tag values for one or more access control tags 304 in accordance with the context rules 228 based on the identified content of the data element 220. The tagging engine 208 may increase or decrease individual access control tag values based on the context rules 228.

In one embodiment, the tagging engine 208 modifies the access control tag value based on additional context information provided by a user or the system 100. For example, a user may provide an input indicating that data element 220 comprises information that is confidential. Based on the information provided by the user, the tagging engine 208 may modify (e.g. increase) the access control tag values. In this example, the access control tag values were increased because the user indicated that the data element 220 needed a higher level of access control. This feature allows the tagging engine 208 to use additional context information when defining access control tag values.

At step 412, the tagging engine 208 stores a copy of the access control tag array 302 linked with the data element 220 in memory (e.g. memory 204). For example, the tagging engine 228 may store the values for the access control tag array 302 as an access control tag map 222. Storing the values for the access control tag array 302 allows other components in the system to verify that the access control tag array 304 was not modified as the data element 220 was transmitted through the system. In some embodiments, step 412 is optional and may be omitted.

Tag Verification

FIG. 5 is a flowchart of an embodiment of a verification method 500 for a verification engine 210 in the access control system 100. The verification 210 may implement method 500 to inspect an access control tag array 302 that is linked with a data element 220. This process allows the verification engine 210 to detect whether the access control tag array 302 has been compromised or modified during transmission. For example, the access control tag array 302 may be modified by a bad actor performing a man-in-the-middle style attack to allow an unauthorized receiver to access the data element 220.

At step 502, the verification engine 210 receives a data element 220. In one embodiment, the verification engine 210 intercepts the data element 220 as its being transmitted from a sending network node 102 to a target network node 102. For example, the verification engine 210 may be implemented by a network node 102 between the sending network node 102 and the target network node 102. In other embodiments, the verification engine 210 is configured to receive the data element 220 from a network node 102 that forwards or reroutes the data element 220 for verification.

At step 504, the verification engine 210 determines whether the data element 220 is linked with an access control tag array 302. For example, the verification engine 210 may analyze metadata or other data linked with the data element 220 to identify whether an access control tag array 302 is present. The verification engine 210 proceeds to step 506 in response to determining that the data element 220 is not linked with an access control tag array 302. The verification engine 210 proceeds to step 508 in response to determining that the data element 220 is linked with an access control tag array 302.

At step 506, the verification engine 210 sends the data element 220 to a tagging engine 208 for tagging. Here, the verification engine 210 determines that the data element 220 is not linked with an access control array tag 302 and redirects the data element 220 to a tagging engine 308 for tagging before the data element 220 is allowed to continue being transmitted. This process provides data access control for data elements 220 that enter the access control system 100 or are generated by network nodes 102 the access control system 100 without being tagged.

Returning to step 504, the verification engine 210 proceeds to step 508 in response to determining that the data element 220 is linked with an access control tag array 302. At step 508, the verification engine 210 identifies access control tag values within the access control tag array 302. In other words, the verification engine 210 identifies a set of access control tag values within the access control tag array 302 that correspond with a set of end user groups 104.

At step 510, the verification engine 210 determines whether the access control tag array 302 is valid for the data element 220. In one embodiment, the verification engine 210 accesses an access control tag map 222 that is linked with the data element 220. The access control tag map 222 comprises the access control tag values that were set when the data element 220 was originally linked with the access control tag array 302. The verification engine 210 compares the identified access control tag values from the data element 220 that was received to the access control tag values in the access control tag map 222. The verification engine 210 determines that the access control tag array 302 linked with the received data element 220 is valid when the identified access control tag values match the access control tag values in the access control tag map 222. Otherwise, the verification engine 210 determines that the access control tag array 302 linked with the received data element 220 is invalid when the identified access control tag values does not match the access control tag values in the access control tag map 222.

In another embodiment, the verification engine 210 identifies the content of the received data element 220 and applies context rules based on the identified content to generate a set of verification access control tag values. For example, the verification engine 210 may generate the set of verification access control tag values using a process similar to the process described in steps 406 and 408 in FIG. 4. The set of verification access control tag values are values that correspond with access control tag values that were used when the data element 220 was originally linked with the access control tag array 302. The verification engine 210 compares the identified access control tag values from the data element 220 that was received to the verification access control tag values. The verification engine 210 determines that the access control tag array linked with the received data element 220 is valid when the identified access control tag values match the verification access control tag values. Otherwise, the verification engine 210 determines that the access control tag array linked with the received data element 220 is invalid when the identified access control tag values does not match the verification access control tag values.

At step 512, the verification engine 210 proceeds to step 514 in response to determining that the access control tag array 302 is valid. Otherwise, the verification engine 210 proceeds to step 516 in response to determining that the access control tag array 302 is invalid.

At step 514, the verification engine 210 forwards the data element 220. Here, the verification engine 210 sends the data element 220 in response to determining that the access control tag array 302 linked with data element 220 has not been modified during transmission. This means that the information provided by the access control tag array 302 is valid and can be used routing and providing access control for the data element 220.

Returning to step 512, the verification engine 210 proceeds to step 516 in response to determining that the access control tag array 302 is invalid. At step 516, the verification engine 210 blocks the data element 220 in response to determining that the access control tag array 302 was modified. In one embodiment, blocking the data element 220 comprises discarding or dropping the data element 220 which prevents the data element 220 from being transmitted to the target network node 102. In another embodiment, blocking the data element 220 comprises rerouting the data element 220. For example, the verification engine 210 may reroute the data element 220 to a safe zone in the network 101 for further analysis. As another example, the verification engine 210 may reroute the data element 220 to an administrative group for approval before forwarding the data element 220 to the target network node 102. In other examples, the verification engine 210 may reroute the data element 220 to any other suitable location in the system 100 to prevent the data element 220 from being transmitted to the target network node 102.

At step 518, the verification engine 210 sends an alert. The alert may comprise information about the sending network node 102, the target network node 102, the network nodes 102 that have forwarded the data element 220, the data element 220, or any other suitable information. The verification engine 210 may send the alert using any suitable messaging protocol or technique. For example, the alert may be an email, a text message (e.g. a short message service (SMS) message), an application pop-up alert, or any other suitable type of message notification. In some embodiments, step 518 is optional and may be omitted.

Selective Data Routing

FIG. 6 is a flowchart of an embodiment of a routing method 600 for a routing engine 212 in the access control system 100. The routing engine 212 may implement method 600 to selectively route a data element 220 based on the information provided by an access control tag array 302 linked with the data element 220. For example, a routing engine 212 may determine whether a target network node 102 for the data element 220 is authorized to receive the data element 220 based on the information provided by the access control tag array 302 and may either forward the data element 220 or block transmission of the data element 220 based on the determination.

At step 602, the routing engine 212 receives a data element 602. In one embodiment, the routing engine 212 intercepts the data element 220 as its being transmitted from a sending network node 102 to a target network node 102. In other embodiments, the routing engine 212 is configured to receive the data element 220 from a network node 102 that forwards or reroutes the data element 220 for access control verification. In other embodiment, the routing engine 212 may be last hop or an edge network node 102 that verifies the access control level of the data element 220 before forwarding the data element 220 to the target network node 102.

At step 604, the routing engine 212 identify a target network node 102 for the data element 220. The routing engine 212 identifies the target network node 102 to identify an end user group 104 associated with the target network node 102. For example, the routing engine 212 may use routing information (e.g. a header) linked with the data element 220 to identify the target network node 102. The routing engine 212 may then determine which end user group 104 the target network node 102 is a member of. In other examples, the routing engine 212 may identify the target network node 102 and the end user group 104 it is associated with using any other suitable technique as would be appreciated by one of ordinary skill in the art. At step 606, the routing engine 212 determines an access control level 224 associated with the end user group 104 for the target network node 102. For example, the routing engine 212 may look-up a previously stored access control level 224 associated with the end user group 104 in memory 204.

At step 608, the routing engine 212 identifies an access control tag 304 in the access control tag array 302 associated with the end user group 104. In other words, the routing engine 212 determines which access control tag 304 in the access control tag array 302 corresponds with the identified end user group 104 for the target network node 102. The routing engine 212 then identifies the value that is stored at the determined access control tag 304. For example, referring to FIG. 3, the routing engine 212 may determine that the identified end user group 104 for the target network node 102 corresponds with access control tag 304C in the access control tag array 302. The routing engine 212 will use the value stored in the access control tag 304C.

Returning to FIG. 6, at step 610, the routing engine 212 compares the identified access control tag value to the access control level 224 of the end user group 104. At step 612, the routing engine 212 determines whether the access control tag value is greater than the access control level 224. The routing engine 212 proceeds to step 614 in response to determining that the access control tag value is greater than or equal to the access control level 224. Otherwise, the routing engine 212 proceeds to step 616 in response to determining that the access control tag value is less than the access control level 224.

At step 614, the routing engine 212 forwards the data element 220 to the target network node 102. Here, the routing engine 212 determines that target network node 102 has permission to access and receive the data element 220 based on the information provided by the access control tag array 302 linked with data element 220. In one embodiment, the routing engine 212 is configured to remove the access control tag array 302 from the data element 220 before sending the data element 220 to the target network node 102.

At step 616, the routing engine 212 blocks the data element 220. In one embodiment, blocking the data element 220 comprises discarding or dropping the data element 220 which prevents the data element 220 from being transmitted to the target network node 102. In another embodiment, blocking the data element 220 comprises rerouting the data element 220. For example, the routing engine 212 may reroute the data element 220 to a safe zone in the network 101 for further analysis. As another example, the routing engine 212 may reroute the data element 220 to an administrative group for approval before forwarding the data element 220 to the target network node 102. In other examples, the routing engine 212 may reroute the data element 220 to any other suitable location in the system 100 to prevent the data element 220 from being transmitted to the target network node 102.

Secure Data Tagging

FIG. 7 is a protocol diagram of an embodiment of a secured tagging method 700 for the access control system 100. The access control system 100 may implement method 700 to provide additional security to data elements 220 that are transmitted through the network 101. This process provides additional security against man-in-the-middle style attacks by allowing a receiving network node 102 to process a received data element 220 to verify that the data element 220 was sent by a trusted sender and that the data element 220 was not modified during transmission.

At step 702, the tagging engine 208 obtains a data element 220. In one embodiment, the tagging engine 208 receives the data element 220 from a network node 102 that generates or originates the data element 220. For example, the data element 220 may be generated by the same network node 102 where the tagging engine 208 is being implemented. In another embodiment, the tagging engine 208 receives the data element 220 from a data repository 106. For example, the tagging engine 208 may access the data repository 106 to obtain the data element 220. In some examples, the data element 220 may be modified before the tagging engine 208 receives the data element 220. For instance, the data element 220 may be reformatted or edited.

At step 704, the tagging engine 208 links the data element 220 with an access control tag array 302. In one embodiment, the tagging engine 208 uses a process similar to the process described in steps 404-410 of FIG. 4 to link the data element 220 with an access control tag array 302.

At step 706, the tagging engine 208 generates a hash of the access control tag array 302. For example, the tagging engine 208 may use a secure hash algorithm (SHA)-256 to generate a hash of the access control tag array 302. In other examples, the tagging engine 208 may use any other suitable hashing technique as would be appreciated by one of ordinary skill in the art. The hash of the access control tag array 302 is uniquely generated based on the combination of values in the access control tag array 302. This generated hash value can be used to verify that the access control tag array 302 has not been modified.

At step 708, the tagging engine 208 encrypts the hash of the access control tag array 302. The tagging engine 208 encrypts the hash of the access control tag array 302 using a first key (e.g. a private key) to generate an encrypted hash. In one embodiment, data that is encrypted using a private key can only be decrypted using a corresponding public key. This feature enables a receiving device to verify that the data (e.g. the encrypted hash) is being sent by a trusted source since only the trusted source can use the private key for encrypting the data. In addition, using the first key to encrypt the hash of the access control tag array provides a layer of data protection that prevents unauthorized parties from accessing or modifying the hash of the access control tag array.

At step 710, the tagging engine 208 obfuscates the access control tag array 302. The tagging engine 208 obfuscates (e.g. encrypts) the access control tag 302 using a second key (e.g. a public key). In one embodiment, data that is obfuscated using a public key can only be deobfuscated using the corresponding private key (i.e. the first key). Using the second key to encrypt the hash of the access control tag array provides an additional layer of data protection that prevents unauthorized parties from accessing or modifying the access control tag array. In some embodiments, the tagging engine 208 may also obfuscate the data element 220 and/or the encrypted hash using the second key.

At step 712, the tagging engine 208 sends the data element 220, the encrypted hash of the access control tag array 302, and the obfuscated access control tag array 302 to a target network node 102. The tagging engine 208 may send the data element 220, the encrypted hash of the access control tag array 302, and the obfuscated access control tag array 302 using any suitable technique or protocol as would be appreciated by one of ordinary skill in the art. Network nodes 102 without the first key and the second key are unable to process or access the data that is being transmitted to the target network node 102. These network nodes 102 are configured to forward the data until the data reaches a network node 102 implementing a routing engine 212 with the first key and the second key.

At step 714, the routing engine 212 receives the data element 220, the encrypted hash of the access control tag array 302, and the obfuscated access control tag array 302. The routing engine 212 deobfuscates the access control tag array 302 using the first key. The routing engine 212 may also deobfuscate any other received data using the first key.

At step 716, the routing engine 212 computes a hash of the access control tag array 302. The routing engine 212 computes a hash of the access control tag array 302 using the same hashing algorithm and protocol that was used by the tagging engine 208 in step 706.

At step 718, the routing engine 212 decrypts the encrypted hash of the access control tag array 302 using the second key. Using the second key, the routing engine 212 is able to recover the original hash of the access control tag array 302. By decrypting the encrypted hash using the second key, the routing engine 212 is able to verify that the data element 220 and the encrypted has were sent from a trusted source. In addition, the routing engine 212 is able to verify that the encrypted hash was not modified during transmission.

At step 720, the routing engine 212 determines whether the computed hash of the access control tag array 302 matches the hash of the access control tag array 302. In other words, the routing engine 212 compares the hash of the access control tag array 302 that was received with the hash computed by the routing engine 212. If the access control tag array 302 has not been modified, then the two hashes should match. If the access control tag array 302 has been modified, then the two hashes will be different. The routing engine 212 proceeds to step 722 in response to determining that the hashes match. Otherwise, the routing engine 212 proceeds to step 726 in response to determining that the hashes do not match.

At step 722, the routing engine 212 determines whether to forward the data element 220 to the target network node 102. In one embodiment, the routing engine 212 determines whether to forward the data element 220 using a process similar to the process described in steps 604-612 of FIG. 6. For example, the routing engine 212 compares an access control level 224 of an end user group 104 associated with the target network node 102 for the data element 220 with an access control tag value that corresponds with the end user group 104 to determine whether the target network node 102 is authorized to receive and access the data element 220. The routing engine 212 forwards the data element 220 to the target network node 102 in response to determining that the target network node 102 is authorized to receive the data element 220. The routing engine 212 proceeds to step 724 in response to determining to forward the data element 220 to the target network node 102. Otherwise, the routing engine 212 blocks the data element 220 in response to determining that the target network node 102 is not authorized to receive the data element 220. The routing engine 212 proceeds to step 726 in response to determining to block the data element 220.

At step 724, the routing engine 212 forwards the data element 220 to the target network node 102. Here, the routing engine 212 sends the data element 220 in response to determining that the access control tag array 302 linked with data element 220 was sent by a trusted source and has not been modified during transmission. This means that the information provided by the data element 220 and the access control tag array 302 is valid and can be trusted. In other words, the information provided by the access control tag array 302 can be used routing and providing access control for the data element 220. In one embodiment, the routing engine 212 is configured to remove the access control tag array 302 from the data element 220 before sending the data element 220 to the target network node 102.

Returning to step 720, the routing engine 212 proceeds to step 724 in response to determining that the hashes do not match. At step 726, the routing engine 212 blocks the data element 220. Here, the routing engine prevents the data element 220 from being sent to the target network node 102 in response to determining that the data element 220 was not sent by a trusted source and/or the access control tag array 302 linked with the data element 220 was modified during transmission. In one embodiment, blocking the data element 220 comprises discarding or dropping the data element 220 which prevents the data element 220 from being transmitted to the target network node 102. In another embodiment, blocking the data element 220 comprises rerouting the data element 220. For example, the routing engine 212 may reroute the data element 220 to an information security group for further analysis. As another example, the routing engine 212 may reroute the data element 220 to an administrative group for approval before forwarding the data element 220 to the target network node 102. In other examples, the routing engine 212 may reroute the data element 220 to any other suitable location in the system 100 to prevent the data element 220 from being transmitted to the target network node 102.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. An access control system, comprising:
   a first network node comprising:
      a first memory comprising:
         a first key; and
         a second key; and
      a tagging engine implemented by a first processor operably coupled to the first memory, configured to:
         obtain a data element;
         link the data element with an access control tag array comprising a plurality of access control tags, wherein:
            each access control tag is linked with an end user group; and each access control tag comprises a baseline access control tag value;
generate a hash of the access control tag array;
encrypt the hash of the access control tag array using the first key to generate an encrypted hash;
apply the second key to the access control tag array, wherein the applying the second key obfuscates the access control tag array; and
send the data element, the encrypted hash, and the obfuscated access control tag array to a target network node within an end user group; and a second network node comprising:
a second memory comprising:
the first key; and
the second key; and
a routing engine implemented by a second processor operably coupled to the second memory, configured to:
receive the data element, the encrypted hash, and the obfuscated access control tag array;
deobfuscate the obfuscated access control tag array using the first key to obtain the access control tag array;
compute a hash of the access control tag array;
decrypt the encrypted hash using the second key to obtain the hash of the access control tag array;
compare the hash of the access control tag array to the computed access control tag array;
forward the data element to the target network node in response to determining that the hash of the access control tag array to the computed access control tag array are the same; and
block transmission of the data element to the target network node in response to determining that the hash of the access control tag array to the computed access control tag array are different.

2. The system of claim 1, wherein the routing engine is further configured to:
identify the end user group associated with the target network node;
determine an access control level associated with the end user group;
identify an access control tag value in the access control tag array corresponding with the end user group;
determine whether the identified access control value is greater than or equal to the access control level associated with the end user group; and
wherein:
forwarding the data element to the target network node is in response to determining that the access control value is greater than or equal to the access control level associated with the end user group; and
blocking transmission of the data element is in response to determining that the access control value is less than the access control level associated with the end user group.

3. The system of claim 1, wherein:
the first memory comprises context rules linking:
content; and
access control tag values for access control tag arrays; and
the tagging engine is configured to:
identify the content of the data element; and
apply the context rules to the access control tag array based on the identified content, wherein applying the context rules changes the access control tag value for one or more of the access control tags in the access control tag array linked with the data element.

4. The system of claim 1, wherein forwarding the data element to the target network node comprises removing the access control tag array prior to transmitting the data element.

5. The system of claim 1, wherein the tagging engine is further configured to encrypt the data element prior to transmitting the data element to the target network node.

6. The system of claim 1, wherein the tagging engine is configured to apply the second key to the encrypted hash prior to sending the encrypted hash.

7. The system of claim 1, wherein blocking transmission of the data element comprises rerouting the data element.

8. An access control method, comprising:
obtaining, by a tagging engine implemented by a first network node, a data element;
linking, by the tagging engine, the data element with an access control tag array comprising a plurality of access control tags, wherein:
each access control tag is linked with an end user group; and
each access control tag comprises a baseline access control tag value;
generating, by the tagging engine, a hash of the access control tag array;
encrypting, by the tagging engine, the hash of the access control tag array using a first key to generate an encrypted hash;
applying, by the tagging engine, a second key to the access control tag array, wherein the applying the second key obfuscates the access control tag array;
sending, by the tagging engine, the data element, the encrypted hash, and the obfuscated access control tag array to a target network node within an end user group;
deobfuscating, by a routing engine implemented by a second network node, the obfuscated access control tag array using the first key to obtain the access control tag array;
computing, by the routing engine, a hash of the access control tag array;
decrypting, by the routing engine, the encrypted hash using the second key to obtain the hash of the access control tag array;
comparing, by the routing engine, the hash of the access control tag array to the computed access control tag array;
forwarding, by the routing engine, the data element to the target network node in response to determining that the hash of the access control tag array to the computed access control tag array are the same; and
blocking, by the routing engine, transmission of the data element to the target network node in response to determining that the hash of the access control tag array to the computed access control tag array are different.

9. The method of claim 8, further comprising:
identifying, by the routing engine, the end user group associated with the target network node;
determining, by the routing engine, an access control level associated with the end user group;
identifying, by the routing engine, an access control tag value in the access control tag array corresponding with the end user group;
determining, by the routing engine, whether the identified access control value is greater than or equal to the access control level associated with the end user group; and wherein:
forwarding the data element to the target network node is in response to determining that the access control value is greater than or equal to the access control level associated with the end user group; and blocking transmission of the data element is in response to determining that the access control value is less than the access control level associated with the end user group.

10. The method of claim 8, further comprising:

identifying, by the tagging engine, the content of the data element; and applying, by the tagging engine, the context rules to the access control tag array based on the identified content, wherein:

the context rules link content with access control tag values for access control tag arrays; and applying the context rules changes the access control tag value for one or more of the access control tags in the access control tag array linked with the data element.

11. The method of claim 8, wherein forwarding the data element to the target network node comprises removing the access control tag array prior to transmitting the data element.

12. The method of claim 8, further comprising encrypting, by the tagging engine, the data element prior to transmitting the data element to the target network node.

13. The method of claim 8, further comprising applying, by the tagging engine, the second key to the encrypted hash prior to sending the encrypted hash.

14. The method of claim 8, wherein blocking transmission of the data element comprises rerouting the data element.

* * * * *